(12) United States Patent
Li et al.

(10) Patent No.: US 8,247,691 B2
(45) Date of Patent: Aug. 21, 2012

(54) CONNECTING MEMBER

(75) Inventors: Zhan-Yang Li, Shenzhen (CN); Xu Yang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

(*) Notice: Subject to any disclaimer, the term of this patent is extended or adjusted under 35 U.S.C. 154(b) by 253 days.

(21) Appl. No.: 12/813,616

(22) Filed: Jun. 11, 2010

(65) Prior Publication Data

US 2011/0155408 A1   Jun. 30, 2011

(30) Foreign Application Priority Data

Dec. 25, 2009   (CN) .......................... 2009 1 0312246

(51) Int. Cl.
*H01R 13/72*   (2006.01)

(52) U.S. Cl. ............. 174/50; 174/58; 439/535; 248/906
(58) Field of Classification Search ............... 174/50, 174/58; 439/535; 248/906; 220/4.02
See application file for complete search history.

(56) References Cited

U.S. PATENT DOCUMENTS

| 7,175,453 B2* | 2/2007 | Yajima et al. ................. 439/164 |
| 7,276,660 B2* | 10/2007 | Lai et al. .......................... 174/50 |
| 7,554,035 B2* | 6/2009 | Chen ................................ 174/66 |
| 7,997,942 B2* | 8/2011 | Dowman ....................... 439/762 |

* cited by examiner

*Primary Examiner* — Dhirubhai R Patel
(74) *Attorney, Agent, or Firm* — Altis Law Group, Inc.

(57) ABSTRACT

A connecting member includes a cable, an enclosure, a shaft assembly member and an elastic member. The cable surrounds the shaft assembly member. The shaft assembly member is rotatably mounted in the enclosure. The elastic member includes a first end and a second end. The first end is secured to the shaft member, and the second end is secured to the enclosure.

16 Claims, 7 Drawing Sheets

CONNECTING MEMBER

BACKGROUND

1. Technical Field

The present disclosure relates to a connecting member for connecting two electronic components of an electronic device.

2. Description of Related Art

Generally, a cable is configured for connecting electronic components, such as a hard disk, a motherboard, or an optical disk drive in order for them to operate. The cable normally has a surplus portion when connected to the electronic components in order to assure the different distances between each component. The surplus portion of the cable takes up a lot of space in the housing, between these electronic components and can be disorderly placed in the electronic device.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
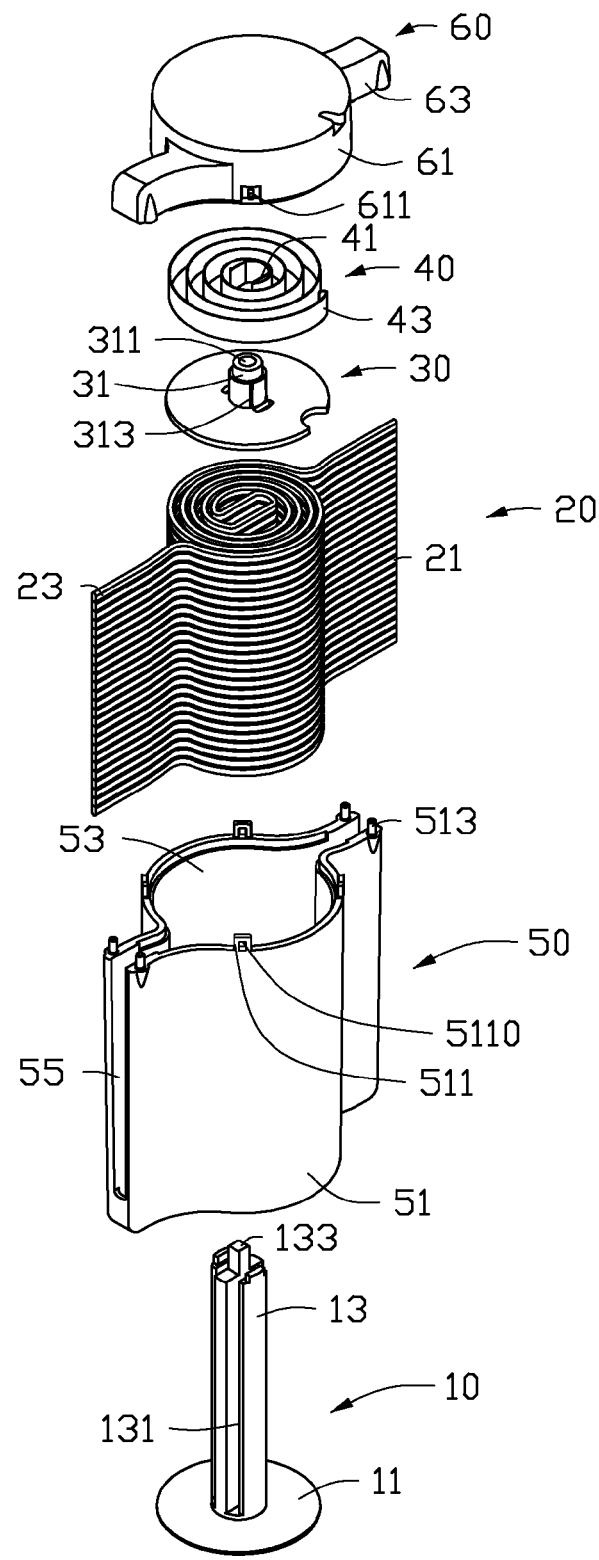
FIG. 1 is an exploded, isometric view of a connecting member in accordance with an embodiment.
Figure 2:
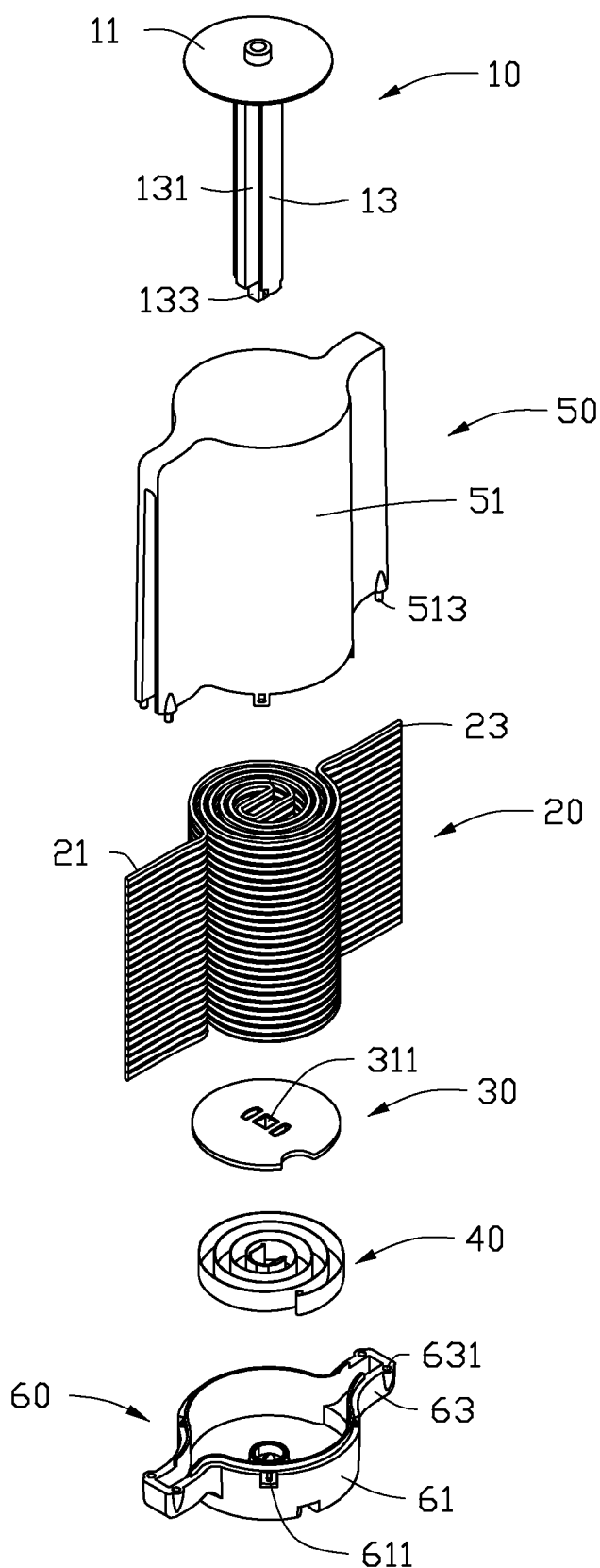
FIG. 2 is similar to FIG. 1, but viewed from a different aspect.

Referring to FIGS. 1 and 2, a connecting member in accordance with an embodiment includes a shaft assembly member 100 (shown in FIG. 4), an enclosure 200 configured for receiving the shaft assembly member 100 (shown in FIG. 7), a cable 20 and an elastic member 40.

The shaft assembly member 100 includes a first shaft member 10 and a second shaft member 30 secured to the first shaft member 10. A bottom base 11 and a shaft portion 13 are disposed on the first shaft member 10. In one embodiment, the bottom base 11 is round. Two receiving slots 131 are defined in two opposite sides of the shaft portion 13, and a positioning block 133 is disposed on the top of the shaft portion 13. A protruding pin 31 protrudes from the center of the second shaft member 30. A positioning slot 311 is defined in the protruding pin 31, and a clipping slot 313 is defined at one side of the protruding pin 31. The positioning slot 311 is configured for mounting the positioning block 133 of the shaft portion 13, and the clipping slot 313 is configured for receiving an end of the elastic member 40.

The cable 20 includes a first end 21 for connecting an electronic component, and a second 23 for connecting another electronic component. The first end 21 is capable of being moved away from the second end 23.

The elastic member 40 includes a first end 41 and a second end 43. The first end 41 is configured to engage in the clipping slot 313.

The enclosure 200 includes a receiving carrier 50 and a top cover 60. The receiving carrier 50 includes two sidewalls 51. A receiving space 53 for receiving the cable 20 and two retaining slots 55 at opposite sides of the receiving carrier 50 are defined between the two sidewalls 51. Two clasping tabs 511 are disposed in a top edge of each sidewall 51, and two latching protrusions 513 are disposed at two opposite ends of the top edge of each sidewall 51. A clasping hole 5110 is defined in each clasping tab 511.

The top cover 60 includes a main body 61 and two positioning arms 63 located on opposite sides of the main body 61. A clip 611 and a catch 613 (shown in FIG. 6) are located on the main body 61. The clip 611 is capable of engaging with the clasping hole 5110 of the receiving carrier 50. A catching hole 6131 (shown in FIG. 6) is defined in the catch 613 to catch the second end 43 of the elastic member 40. Each positioning arm 63 defines two positioning holes 631 corresponding to the latching protrusions 513 of the receiving carrier 50.

Figure 3:
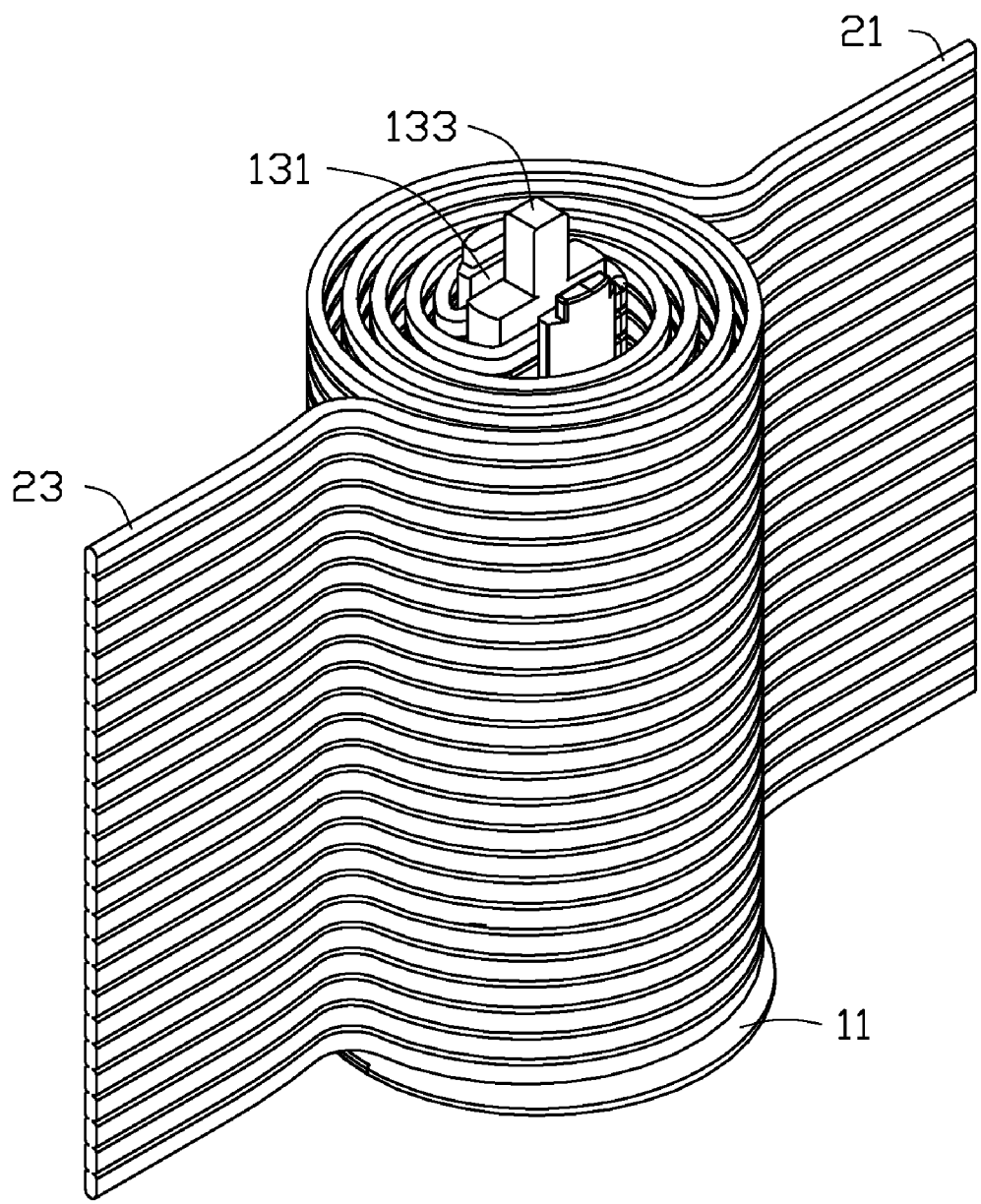
FIG. 3 is an assembled view of a cable and a first shaft member of FIG. 1.

Referring to FIG. 3, in assembly, a portion of the cable 20 is clipped into the two receiving slots 131 of the first shaft member 10. Then, the cable 20 is wound about the shaft portion 13 of the first shaft member 10 in a direction.

Figure 4:
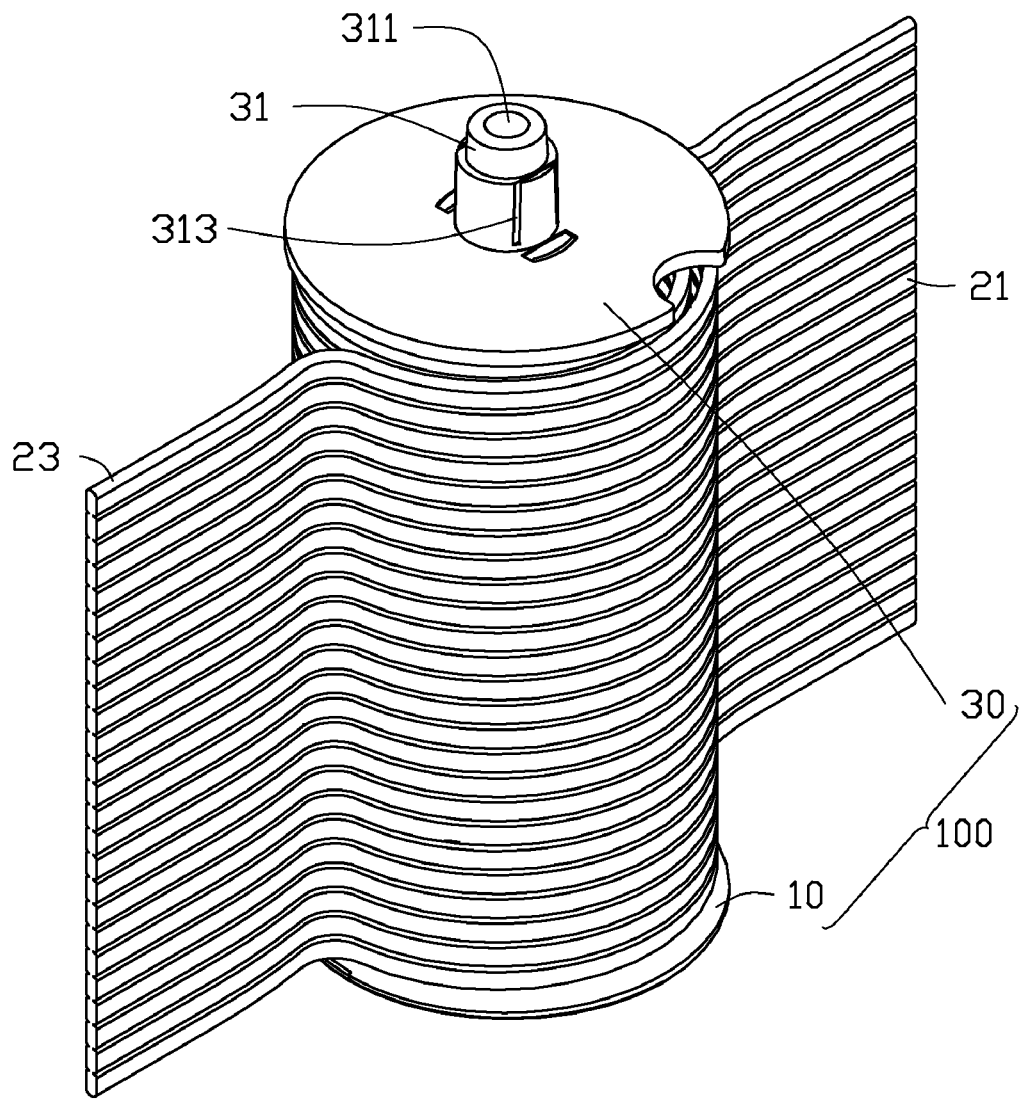
FIG. 4 is an assembled view of the cable, the first shaft member and a second shaft member of FIG. 1.

Referring to FIG. 4, the second shaft member 30 is placed on the first shaft member 10, the positioning block 133 of the first shaft member 10 is inserted into the positioning slot 311 of the protruding pin 31 of the second shaft member 30, so as to mount the second shaft member 30 to the first shaft member 10.

Figure 5:
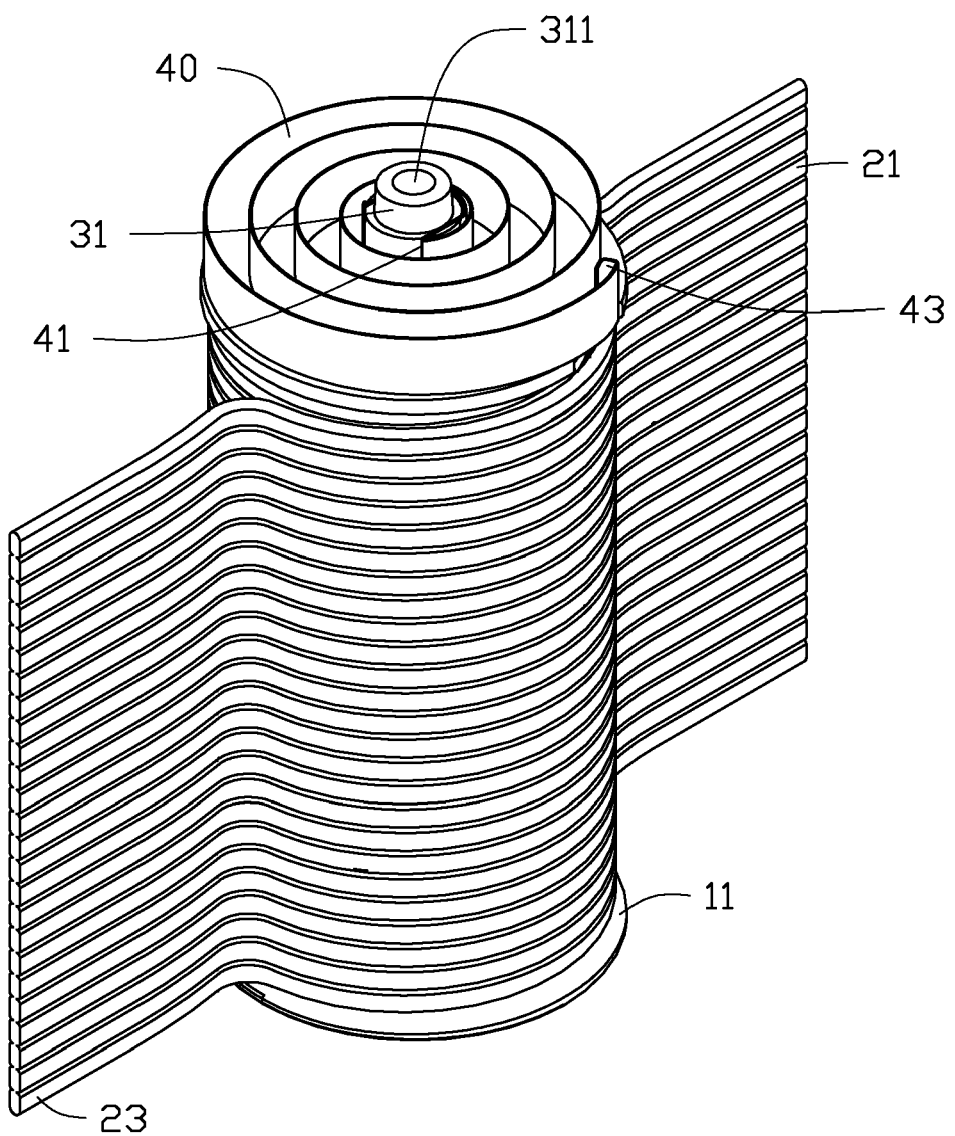
FIG. 5 is an assembled view of the cable, the first shaft member, the second shaft and an elastic member of FIG. 1.

Referring to FIG. 5, the elastic member 40 surrounds the protruding pin 31 of the second shaft member 30, and the first end 41 of the elastic member 40 is clipped into the clipping slot 313 of the protruding pin 31 of the second shaft member 30.

Figure 6:
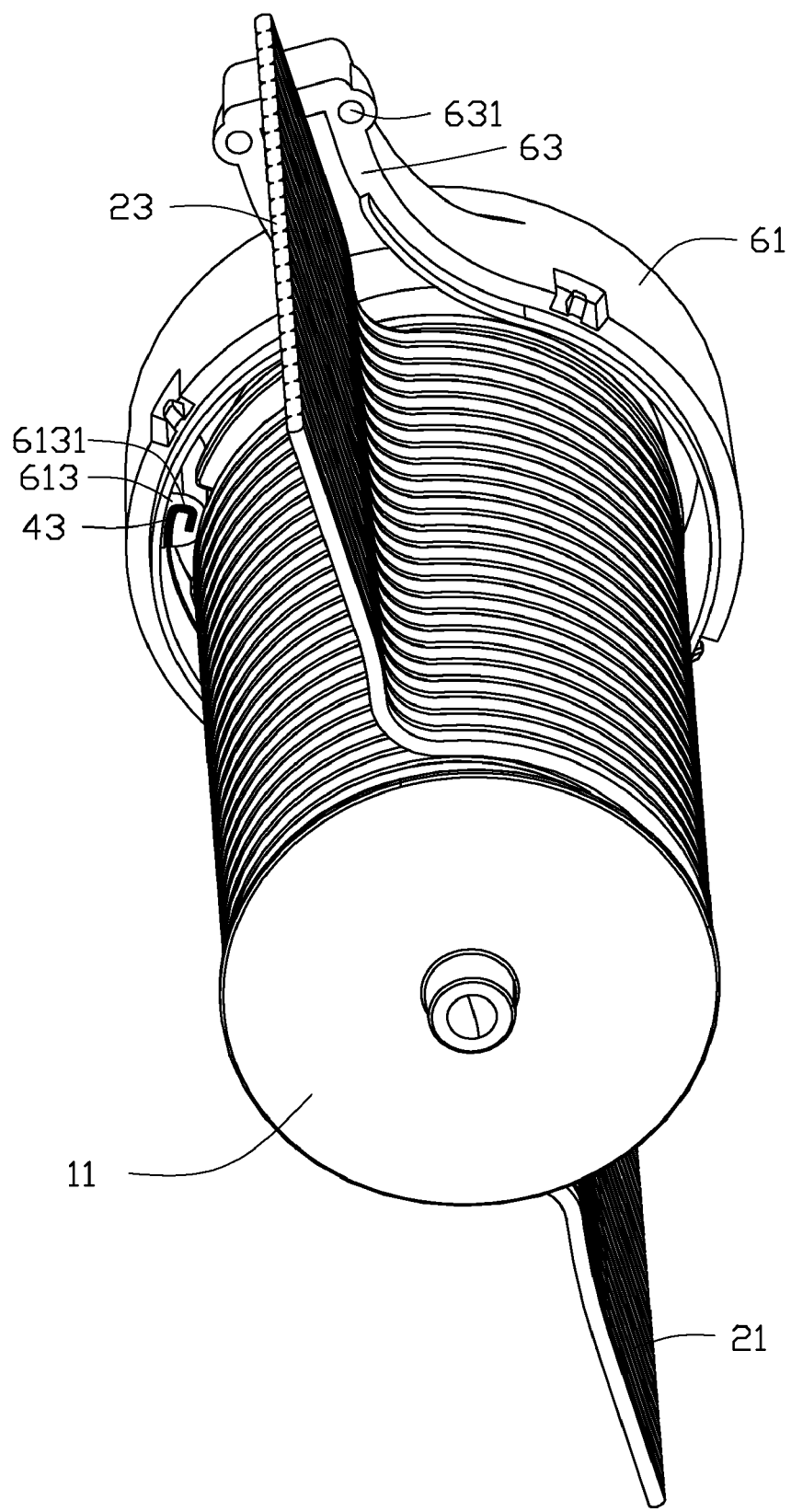
FIG. 6 is an assembled view of the cable, the first shaft member, the second shaft, the elastic member and a top cover of FIG. 1.

Referring to FIG. 6, the top cover 60 is covered on the elastic member 40, and the second end 43 of the elastic member 40 is clipped into the catching hole 6131 of the catch 613 of the top cover 60.

Figure 7:
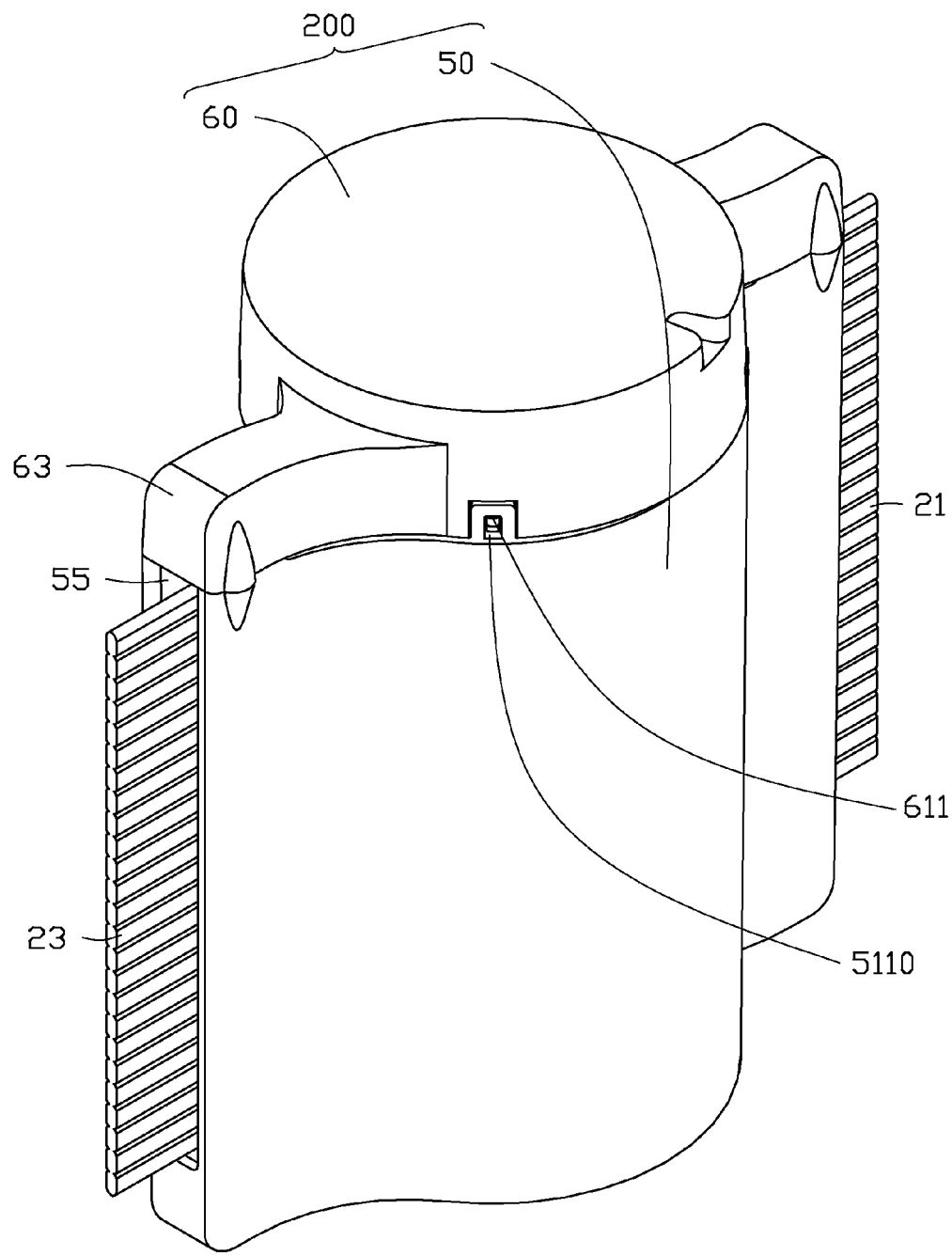
FIG. 7 is an assembled view of FIG. 1.

Referring to FIG. 7, the receiving carrier 50 is orderly passed through the bottom base 11 and the shaft portion 13. The first end 21 is received into one of the two retaining slots 55 of the receiving carrier 50, and the second end 23 is received into another one of the two retaining slots 55 of the receiving carrier 50. The latching protrusions 513 of the sidewalls 51 are inserted into the positioning holes 631 of the top cover 60, and the clips 611 of the top cover 60 are clipped into the clasping hole 5110 of the sidewalls 51. At this time, the elastic member 40 is in its original state, the cable 20 is located in a first location, and the first end 21 and the second end 23 extend out of the enclosure 200 via the retaining slots 55.

In use, the first end 21 of the cable 20 is connected to an electronic component of an electronic device enclosure (not shown). The second end 23 of the cable 20 is connected to another electronic component (not shown). To see if the electronic device works, the bracket needs to move out of the electronic device enclosure so the electronic device can be tested. At this time, the first end 21 of the cable 20 is moved away from the second end 23 in a first direction, and rotates the first shaft member 10 in a direction opposite to the first direction. Therefore, the second shaft member 30 is rotated by the first shaft member 10, so that the elastic member 40 becomes tight around the second shaft member 30, and is elastically deformed. The length of the first end 21 and the second end 23 out of the receiving carrier 50 becomes longer and longer, to make sure that the cable 20 is capable of connecting one electronic component to another electronic component. When the bracket is placed back in the electronic device enclosure, the elastic member 40 is resiliently deformed, to pull the first end 21 and the second end 23 of the cable 20 to move in the opposite direction, until the cable 20 is back to the original location.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A connecting member comprising:
   an enclosure;
   a cable configured for electronically being connected to two electronic components;
   a shaft assembly member comprising a first shaft member and a second shaft member, the first shaft member securing the cable, the shaft assembly member rotatably mounted in the enclosure; and
   an elastic member comprising a first end and a second end, the first end mounted to the shaft assembly member, and the second end mounted to the enclosure;
   wherein the first end of the elastic member is secured to the second shaft member, and the enclosure comprises a top cover securing the second end of the elastic member.

2. The connecting member of claim 1, wherein the cable is wound about the first shaft member.

3. The connecting member of claim 2, wherein the first shaft member defines a receiving slot, and the receiving slot is configured to secure the cable.

4. The connecting member of claim 2, wherein the second shaft member is rotatably mounted on the first shaft member.

5. The connecting member of claim 4, wherein a positioning block is disposed on the first shaft member, and the second shaft member defines a positioning slot engaging with the positioning block.

6. The connecting member of claim 1, wherein the second shaft member comprises a protruding pin, the protruding pin defines a clipping slot securing the first end of the elastic member, and a catch is disposed on the top cover to clasp the second end of elastic member.

7. The connecting member of claim 1, wherein the enclosure comprises a receiving carrier mounted to the top cover, and the receiving carrier defines two retaining slots.

8. The connecting member of claim 7, wherein the receiving carrier comprises a sidewall, a clasping hole is defined in the sidewall, and a clip is located on the top cover.

9. A connecting member comprising:
   an enclosure comprising a receiving carrier and a top cover mounted on the receiving carrier,
   a cable configured for electronically being connected to two electronic components,
   a shaft assembly member comprising a first shaft member and a second shaft member mounted to the first shaft member, the first shaft member surrounding the cable;
   an elastic member comprising a first end and a second end, the first end secured to the second shaft member, the second end secured on the top cover,
   wherein the cable is received in the receiving carrier when the elastic member is original state, and the elastic member is elastically deformed when the cable is moved out of the receiving carrier.

10. The connecting member of claim 9, wherein the first shaft member defines a receiving slot, and the receiving slot is configured to secure the cable.

11. The connecting member of claim 10, wherein the receiving carrier comprises a sidewall, and the receiving slot is defined by the sidewall.

12. The connecting member of claim 11, wherein a clasping hole is defined in the sidewall, and a clip is located on the top cover.

13. The connecting member of claim 11, wherein a latching protrusion protrudes from the sidewall, and a positioning hole is defined in the top cover to engage with the latching protrusion.

14. The connecting member of claim 13, wherein a positioning arm is disposed on the top cover, and the positioning hole is defined in the positioning arm.

15. The connecting member of claim 9, wherein a positioning block is disposed on the first shaft member, and the second shaft member defines a positioning slot that engages with the positioning block.

16. The connecting member of claim 9, wherein the second shaft member comprises a protruding pin, the protruding pin defines a clipping slot securing the first end of the elastic member, and a catch is defined on the top cover to clasp the second end of elastic member.

* * * * *